United States Patent Office.

J. ASHTON GREENE, OF BROOKLYN, NEW YORK, ASSIGNOR TO HIMSELF AND JOHN H. YOUNG, OF BEVERLY, MASSACHUSETTS.

Letters Patent No. 88,706, dated April 6, 1869.

IMPROVEMENT IN THE MANUFACTURE OF VULCANIZED RUBBER BOOTS AND SHOES

The Schedule referred to in these Letters Patent and making part of the same.

To whom it may concern:

Be it known that I, J. ASHTON GREENE, of Brooklyn, in the county of Kings, and State of New York, have invented certain new and useful Improvements in the Manufacture of Vulcanized India-Rubber Boots and Shoes; and I hereby declare the following to be a full, clear, and exact description of the same.

The ordinary method of making India-rubber boots and shoes is to build up the boot or shoe on a last, the parts of which the article is to be composed, i. e., the sole, upper, &c., and then after cementing said parts together, to vulcanize the article in a suitable heater.

In order to make shoes or boots in this manner, none but the purest and best rubber, or vulcanizable gum can successfully be employed, and consequently the articles are expensive, while the process of manufacture itself, as it requires the parts to be formed and cut out previously to their being applied to the last, is productive of considerable labor, and requires time, thus increasing the expense.

The object of my invention is to reduce the expense of manufacture, and at the same time to employ a cheaper and more inexpensive material from which to make the article.

To this end, I have devised a method of forming rubber boots and shoes in moulds, in contradistinction to building them upon lasts, and by such method I am enabled to employ as the stock for the manufacture of such articles, rubber scraps, waste, or trimmings, or fibrous rubber, or rubber mixed with cloth or leather, or otherwise adulterated, sufficient rubber being left to effect the required vulcanization.

In carrying out my invention, I provide an inner last, or mould of the shape required for the boot or shoe, upon which the rubber, whether pure or mixed, and adulterated with other substances, as aforesaid, is laid or spread to the required thickness.

I also provide an outer hollow mould, formed in sections in the usual manner, the interior of which conforms in shape to the inner mould, but is of greater capacity, or size than the said mould, so that when the latter is enclosed within the former, there will be a continuous space between the two, of sufficient dimensions to contain the rubber from which the shoe is to be formed.

After spreading or laying the rubber, or fibrous adulterated rubber, as above specified, over the inner mould, the sections of the outer mould are placed over the rubber, and then bolted or clamped tightly together.

The rubber shoe is thus shaped between the two moulds, which it may be said, should be so formed, as to give the shoe, or other article increased thickness on the sole, heel, and other parts where increased thickness is desirable.

After this, the mould is placed in the vulcanizer, or heater, and there allowed to remain until vulcanization is completed.

It is then taken out from the heater, the outer mould is removed from the vulcanized-rubber article, from which the inner mould, or last is then drawn out and the article is afterwards finished and trimmed in the usual manner.

Whatever excess of rubber there may be oozes out from between the joints of the outer mould during the process of vulcanization, so that no danger arises from putting in too much rubber.

The outer mould may be divided vertically into two sections, or horizontally if preferred, and in the latter case, the line of junction of the two sections may be made to follow the line of the sole of the shoe, so as to avoid the formation of a ridge, (which must be trimmed off,) on the front of the upper.

The inner mould may be made hollow, or of a jacket-like form, if desired, to receive steam, and thus heat the shoe from the interior; and heat may be applied from the exterior by introducing steam into the outer mould, made hollow for the purpose, or both moulds can be made hollow, so as to heat the shoe both internally and externally.

The shoe or boot may be strengthened or reinforced upon the inside, by means of cloth, or fabric of suitable size or dimensions, applied to the last, or inner mould before the rubber is vulcanized.

For instance, the heel may be thus lined, or there may be a strip of fabric around the top of the shoe, or the whole interior of the shoe may be lined.

I have also applied a strip of cloth, or canvas to that part of the rubber shoe where the slit in ordinary laced leather boots or shoes is formed.

After the rubber shoe is vulcanized, this portion of it may be slit, and this may be necessary in some instances, in order to admit of its ready removal from the last, or mould, and lacing-holes then formed on each side of the slit, to allow of the shoe being drawn tightly, and held firmly upon the foot of the wearer.

The canvas on each side of the slit reinforces the shoe, so as to admit of the lacing being effected without danger of causing the rubber to be torn or ruptured.

As above stated, the stock of which the shoe is formed, need be of little cost. I prefer to use fibrous rubber, that is, rubber mixed, or adulterated with cloth, cotton waste, or other fibrous material; and for the purpose, I can use the waste of rubber-factories, such as fibrous rubber scraps, trimmings, &c., which after being reground, will fully answer my purpose.

I can also mix the rubber with leather, or adulterate it with other suitable substances, leaving enough prepared rubber to effect vulcanization, as above specified.

Having now described my invention, and the manner in which the same is or may be carried into effect,

What I claim, and desire to secure by Letters Patent, is—

1. As a new article of manufacture, a moulded vulcanized rubber boot or shoe.

2. The method herein described, of making boots or shoes of a vulcanizable composition, by the process, and substantially in the manner above described.

In testimony whereof, I have signed my name to this specification, before two subscribing witnesses.

J. ASHTON GREENE.

Witnesses:
HENRY A. TWEED,
JOHN H. McCOY.